(12) United States Patent
Mituta

(10) Patent No.: US 8,519,839 B2
(45) Date of Patent: Aug. 27, 2013

(54) ALARM SYSTEMS AND METHODS FOR VEHICLE CHARGE CORDS

(75) Inventor: Andres V. Mituta, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 368 days.

(21) Appl. No.: 12/430,374

(22) Filed: Apr. 27, 2009

(65) Prior Publication Data

US 2010/0271192 A1    Oct. 28, 2010

(51) Int. Cl.
*B60Q 1/00*    (2006.01)

(52) U.S. Cl.
USPC ... 340/455; 180/65.265; 320/165; 340/425.5; 340/426.1; 340/438; 439/304; 701/22

(58) Field of Classification Search
USPC .............. 340/425.5, 455, 438, 932.2, 428, 340/426.1, 426.24, 426.34; 701/22; 180/65.29, 180/65.2; 320/165, 56, 109; 903/902, 907, 903/930; 439/304, 345

See application file for complete search history.

(56) References Cited

U.S. PATENT DOCUMENTS

| 5,903,064 A | * | 5/1999 | Norberg ......................... 307/40 |
| 7,595,607 B2 | * | 9/2009 | Lambert et al. ............... 320/106 |
| 7,886,857 B2 | * | 2/2011 | Fujitake ..................... 180/65.29 |
| 2010/0188199 A1 | * | 7/2010 | Tanaka et al. .............. 340/426.1 |
| 2011/0175569 A1 | * | 7/2011 | Austin .......................... 320/109 |

FOREIGN PATENT DOCUMENTS

| CN | 201057571 Y | 5/2008 |
| JP | 10178701 A | 6/1998 |

OTHER PUBLICATIONS

Chinese Office Action, dated Feb. 29, 2012, for Chinese Patent Application No. 201010170342.X.

* cited by examiner

*Primary Examiner* — Brent Swarthout

(74) *Attorney, Agent, or Firm* — Ingrassia Fisher & Lorenz, P.C.

(57) ABSTRACT

An alarm system associated with a charge cord of a plug-in vehicle is provided. The system includes a sensor configured to evaluate a status of the charge cord, including a coupled status when the charge cord is coupled to the vehicle and a decoupled status when the charge cord is not coupled to the vehicle. The system further includes an alarm interface coupled to the sensor and configured to activate an alarm when the charge cord is in the decoupled status.

19 Claims, 2 Drawing Sheets

ALARM SYSTEMS AND METHODS FOR VEHICLE CHARGE CORDS

TECHNICAL FIELD

The following description generally relates to alarm systems and methods associated with charge cords for plug-in electric and hybrid electric vehicles.

BACKGROUND

Electric and hybrid electric vehicles are gaining in popularity. Many such vehicles are so-called "plug-in" vehicles. In a plug-in vehicle, only a limited number of miles may be traveled on battery power alone. As such, the vehicle battery is typically charged from a power source such as a public or private electrical outlet that receives electricity from an electric utility.

Typically, a charge cord is used to connect the vehicle utility power source to the vehicle battery such that the battery is charged to operate the vehicle. Once connected, the vehicle charging system typically begins charging the vehicle battery until the battery is completely charged. Charge cords usually have a first end that plugs into the vehicle at a charging port and second end that plugs into a utility power outlet. These charge cords are generally used when a vehicle is parked, such as in a garage. Designers also envision a situation in which plug-in vehicles are charged at more public charging stations, such as at places of employment or commercial establishments. At such stations, the vehicle owner might supply the charge cord to be used with the utility outlet at the station.

Conventional charge cords presently have no mechanism for securing the charge cord to the vehicle or the utility outlet. As such, the charge cord may be subject to theft, particularly in public charging stations, and would therefore need to be replaced to continue operation of the vehicle.

Accordingly, it is desirable to provide an alarm system associated with the charge cord to deter theft. Furthermore, other desirable features and characteristics will become apparent from the subsequent detailed description and the appended claims, taken in conjunction with the accompanying drawings and the foregoing technical field and background.

SUMMARY

In accordance with an exemplary embodiment, an alarm system associated with a charge cord of a plug-in vehicle is provided. The system includes a sensor configured to evaluate a status of the charge cord, including a coupled status when the charge cord is coupled to the vehicle and a decoupled status when the charge cord is not coupled to the vehicle. The system further includes an alarm interface coupled to the sensor and configured to activate an alarm when the charge cord is in the decoupled status.

In accordance with another exemplary embodiment, a method is providing for alerting a user of removal of a charge cord initially coupled to a plug-in vehicle. The method includes arming an alarm system associated with the plug-in vehicle; evaluating a status of the charge cord; and alerting the user based on the status of the charge cord.

DESCRIPTION OF THE DRAWINGS

A more complete understanding of the subject matter may be derived by referring to the detailed description and claims when considered in conjunction with the following figures, wherein like numerals denote like elements, and wherein:

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

The following description refers to elements or features being "connected" or "coupled" together. As used herein, "connected" may refer to one element/feature being directly joined to (or directly communicating with) another element/feature, and not necessarily mechanically. Likewise, "coupled" may refer to one element/feature being directly or indirectly joined to (or directly or indirectly communicating with) another element/feature, and not necessarily mechanically. However, it should be understood that although two elements may be described below, in one embodiment, as being "connected," in alternative embodiments similar elements may be "coupled," and vice versa. Thus, although the schematic diagrams shown herein depict example arrangements of elements, additional intervening elements, devices, features, or components may be present in an actual embodiment. It should also be understood that FIGS. 1 and 2 are merely illustrative and may not be drawn to scale.

Figure 1:
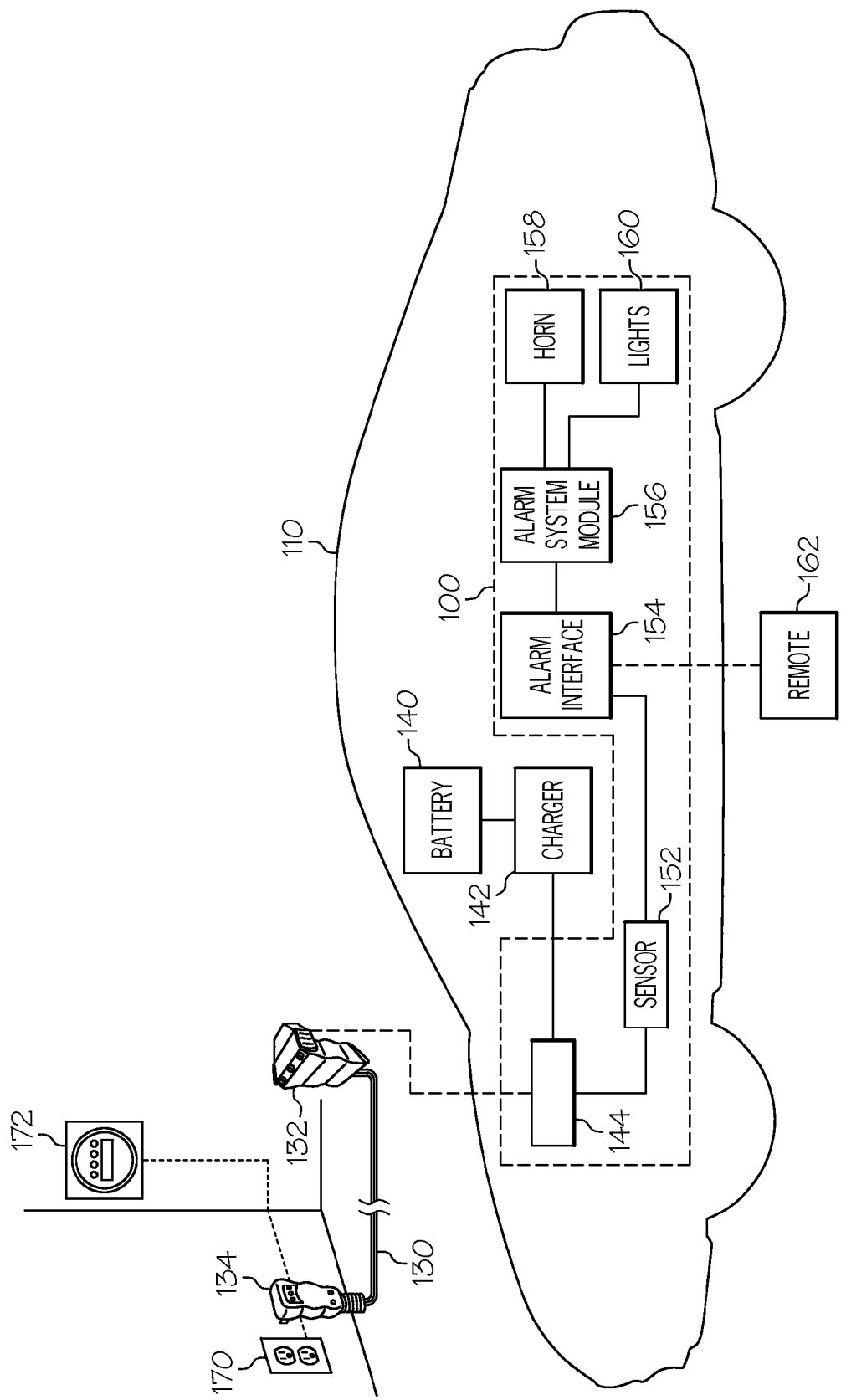
FIG. 1 is a block diagram of an alarm system for charge cords of plug-in vehicles in accordance with an exemplary embodiment.
Figure 2:
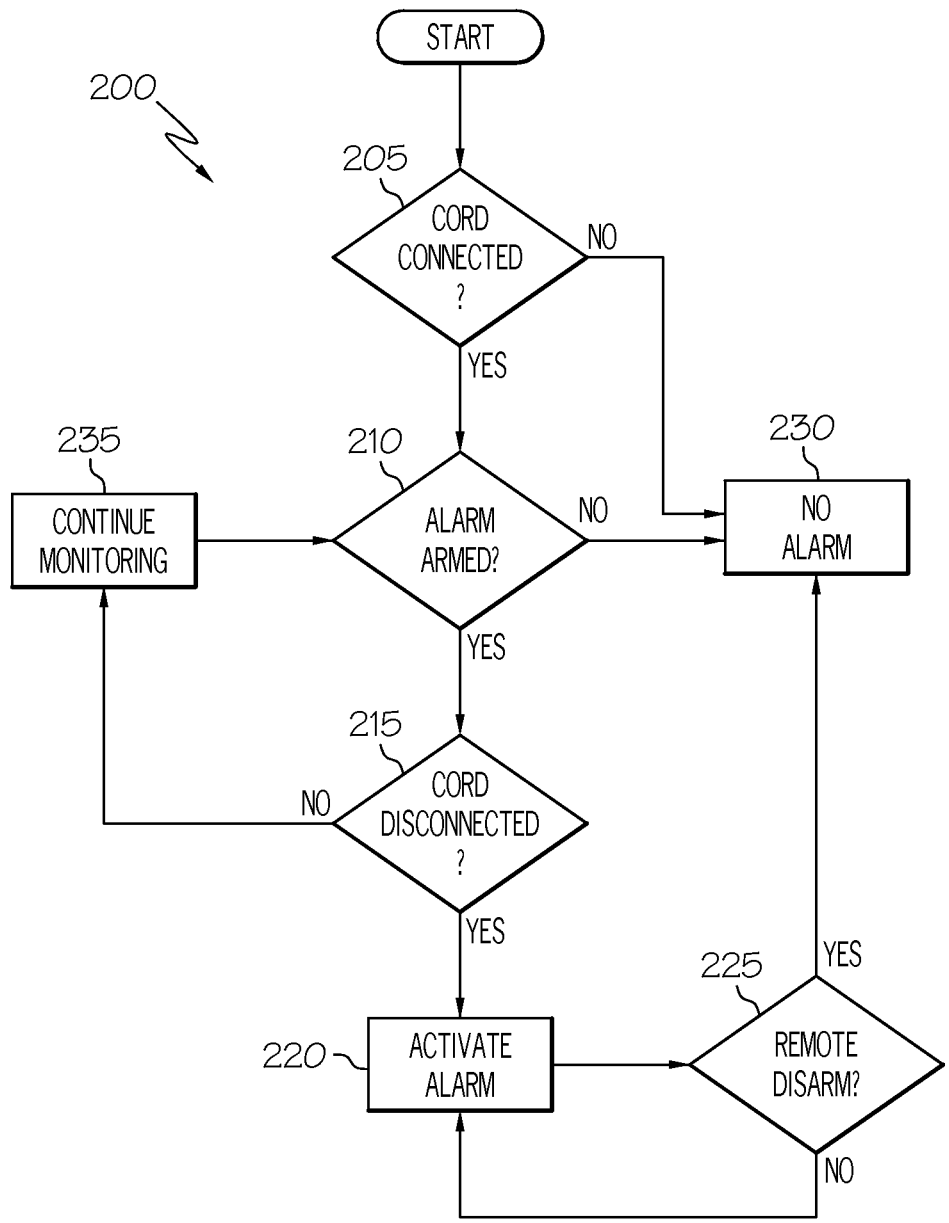
FIG. 2 is a flow chart of an exemplary method of alerting a user of charge card theft in accordance with an exemplary embodiment.

FIG. 1 is a block diagram illustrating a charge cord alarm system 100 in accordance with an exemplary embodiment. The system 100 is typically mounted within a vehicle 110. The vehicle 110 may be any type of plug-in vehicle that is charged by an external source, including a plug-in electric vehicle or a plug in hybrid-electric vehicle. Moreover, the vehicle 110 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD).

In one embodiment, the vehicle 110 includes a battery 140 used to power an actuator assembly (not shown), such as a powertrain. The actuator assembly may include an electric motor system that, in one embodiment, includes one or more sinusoidally-wound, three-phase alternating current (AC) motor/generators (or motors) (e.g., permanent magnet). In order to power the electric motor, direct current (DC) power is provided from the battery 140 to an inverter, which converts the DC power to AC power, prior to energizing the electric motor. The charge cord alarm system 100 may also be used with different motor and/or vehicle configurations.

The battery 140 is charged with a charger 142 that includes a charging port 144 configured to receive a charge cord 130. The charge cord 130 couples the vehicle 110, particularly the charger 142, to a power source 172 via the charging port 144. More specifically, the charge cord 130 is configured to be removably connected to the vehicle 110 at the charging port 144, as will be discussed in further detail below.

The charge cord 130 has a utility end 134 and a vehicle end 132. In FIG. 1, the vehicle 110 is illustrated with the charge cord 130 about to be coupled to a utility power socket 170 associated with the utility power source 172. The utility end 134 may be configured to connect to a standard type of power socket or may be configured to accept adaptors for connecting to more than one type of power socket. The vehicle end 132 of charge cord 100 is configured to connect with charging port 144 to electrically couple the vehicle charger 142 and battery 140 to the utility power source 172.

The utility power socket 170 may be configured as any type of power socket such as 110 volt or 220 volt. The utility power socket 170 may be located at any location, such as at a private residence, place of employment, and/or public charging station. Other voltages may also be used, such as any wall voltage available in the US or internationally.

As will now be discussed in further detail, alarm system 100 in accordance with an exemplary embodiment may deter theft of the charge cord 130. In one exemplary embodiment, the system 100 includes a charge cord sensor 152, an alarm interface 154, an alarm system module 156, a horn 158, and lights 160.

As noted above, the charge cord 120 is coupled to the vehicle 110 at the charging port 144. The charge cord sensor 152 monitors the charging port 144 to detect the presence of the charge cord 130. In general, the charge cord sensor 152 can be any hardware and/or software module with the ability to measure electrical characteristics of power flowing through charge cord 100 via the charging port 144. For example, the charge cord sensor 152 may include circuits for measuring the voltage level of AC power at the charging port 144 such as a voltage meter or a voltage comparator circuit, or include circuits for measuring current flowing through charge cord 100 to vehicle 110, such as a current meter. In another exemplary embodiment, the charge cord sensor 152 is a proximity sensor that detects, through a voltage divider, the presence of the charge cord 120, even without being connected to the utility power socket 170.

The charge cord sensor 152 sends a signal to the alarm interface 154 that indicates the presence or absence of the charge cord 130 in the charging port 144. If the charge cord 130 is coupled to the charging port 130, the sensor 152 indicates a connected status to the alarm interface 154. Conversely, if the charge cord 130 is not coupled to the charging port 144, the sensor 152 indicates a disconnected status to the alarm interface 154. The sensor 152 can also indicate a change in status, for example, from connected to disconnected, to the alarm interface 154.

The alarm interface 154 also receives a signal from the remote 162. In general, the remote 162 may place the system 100 in one of at least two states: an armed state or a disarmed state. In one exemplary embodiment, the alarm interface 154 comprises a receiver (or transceiver) that is configured to receive (and/or send) information and instructions from the remote 162, which may be a transmitter (or transceiver). The information connection between the remote 162 and the alarm interface 154 may be of any type, including but not limited to radio waves, sound waves, lasers, infrared waves, magnetic fields, or the like. In general, the remote 162 may include any number or type of actuators or data entry mechanisms that allow the user to arm and disarm the system 100. In one exemplary embodiment, the remote 162 is a key fob that includes a button that, when pressed, alternatively arms and disarms the system 100. The remote 162 may also include an information conveying device, such as a display, a light bulb, a speaker, or a vibration mechanism, that may activate and notify the user if the alarm system has been activated, as discussed in greater detail below. The remote 162 may also be a smart keyless system, which allows a user to perform other functions associated with the vehicle 110, including locking and unlocking the door and opening the trunk.

In addition to the charge cord sensor 152, the alarm interface 154 may also interface with other modules in the automobile, and need not be restricted to the alarm system module 156 or alarm-related functions. For example, as noted above, the remote 162 may include a button to remotely open or unlock the trunk or doors. These functions may be controlled by the logic in the alarm system module 156 or a different module or controller. Moreover, the system 100 may be armed by other actions related to the vehicle 110. For example, the system 100 may be armed by locking the doors while the charge cord 130 is coupled to the vehicle.

In general, the alarm interface 154 activates the alarm system module 156 based on the connected or disconnected status of the charge cord 130 provided by the sensor 152 and the armed or disarmed state of the system 100 provided by the remote 162. If the system 100 is in an armed state and the status of the charge cord 130 transitions from connected to disconnected, the alarm interface activates the alarm system module 156.

In one aspect, in an activated state, the alarm system module 156 will sound the horn 158 and/or flash lights 160. The lights 160 may be the automobile's headlights, parking lights, interior lights, and/or any other lights. The horn 158 can be the vehicle horn or any other audible signal. In a further embodiment, the alarm system module 156 and/or alarm interface 154 may alert the user of the alarm system 100 activation via the remote 162. As noted above, an actuator in the remote 162 can provide a visual signal, an audio signal, and/or a tactile signal such as a buzzer. The user may de-activate the alarm system 100 with the remote 162. Alternatively, the alarm system 100 may remain activated for a predetermined amount of time, such as 60 seconds or so, after which it may revert back to the armed state.

In further scenarios, the alarm interface 154 will not activate the alarm system module 156. For example, if the system 100 is not armed by the remote 162, the alarm interface 154 will not activate the alarm system module 156. Similarly, if the charge cord 130 maintains a connected status, the alarm interface 154 will not activate the alarm system module 156. Finally, in one exemplary embodiment, if the charge cord 130 maintains a disconnected status (i.e., the charge cord 130 was not connected before arming the system 100), the alarm interface 154 will not activate the alarm system module 156. Additionally, the alarm interface 154 may activate the alarm system module 156 upon the occurrence of inciting events unrelated to the charge cord 130. For example, such inciting event may include opening of a locked door or starting the engine during an armed state.

In general, the alarm interface 154 and alarm system module 156 may be incorporated into, or in operable communication with, an electronic control system that may be in operable communication with battery 140, actuator assembly (not shown), and inverter (not shown). Although not shown in detail, the alarm interface 154 and alarm system module 156 may include various sensors, automotive control modules, or electronic control units (ECUs), including logic circuitry, processor and/or memory components for carrying out the processes and methods described below.

FIG. 2 shows a flow chart according to an exemplary alarm method 200 associated with a vehicle charge cord. Reference is additionally made to FIG. 1.

In step 205, the system 100 determines whether the charge cord 130 is coupled to the charging port 144, and thus, the vehicle 110. In one embodiment, the sensor 152 determines whether or not the charge cord 130 is coupled to the vehicle 110. If the charge cord 130 is not coupled to the charging port 144 in step 205, the system 100 takes no action and no alarm is activated, as indicated by step 230. If charge cord 130 is coupled to the charging port 144 in step 205, the system 100 proceeds to step 210 in which it determines whether the system 100 is armed, for example with the remote 162. If the system 100 is not armed in step 210, the system 100 takes no action and no alarm is activated, as indicated by step 230. In other embodiments, the order of steps 205 and 210 may be reversed. In other words, the system 100 only determines whether the charge cord 130 is coupled to the charging port 144 if the vehicle 110 is armed.

If the system 100 is armed in step 210, the system 100 proceeds to step 215 in which the system 100 determines if the charge cord 130 has been disconnected. In one embodiment, the sensor 152 sends a signal to the alarm interface 154 about the presence or absence of the charge cord 130. If in step 215, the charge cord 130 is still coupled to the socket 144, the method 200 proceeds to step 235, in which monitoring is maintained, and subsequently to step 210, in which it is again determined whether or not the system 100 is armed. However, if in step 220, the charge cord 130 has been removed from the socket 144, the method proceeds to step 220 in which an alarm is sounded. As noted above, the alarm can include a honking of the horn 158 and blinking of lights 160 of the vehicle 110. The system 100 may also send a notification to the user of the vehicle 110. In step 225, the system 100 determines whether the user has disarmed the system 100, for example, with the remote 162. If yes in step 225, the system 100 turns off the alarm in step 230. If no in step 225, the system 100 continues the alarm, as indicated by the return to step 220.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A charge cord theft alarm system associated with a charge cord of a plug-in vehicle, the system comprising:
   a charging port mounted on the plug-in vehicle and configured to couple the charge cord to the plug-in vehicle;
   a sensor configured to evaluate a status of the charge cord, including a coupled status when the charge cord is coupled to the vehicle and a decoupled status when the charge cord is not coupled to the vehicle, the sensor being arranged proximate to the charging port; and
   an alarm interface coupled to the sensor and configured to selectively operate in an armed state or a disarmed state, wherein,
   when the alarm interface is in the armed state and the sensor indicates that the charge cord is in the coupled status, the alarm interface is configured to not activate an alarm,
   when the alarm interface is in the armed state and the sensor indicates that the charge cord is in the decoupled status, the alarm interface is configured to activate the alarm,
   when the alarm interface is in the disarmed state and the sensor indicates that the charge cord is in the coupled status, the alarm interface is configured to not activate the alarm, and
   when the alarm interface is in the disarmed state and the sensor indicates that the charge cord is in the decoupled status, the alarm interface is configured to not activate the alarm.

2. The charge cord theft alarm system of claim 1, further comprising a remote transmitter configured to place the alarm interface in the armed state or disarmed state.

3. The charge cord theft alarm system of claim 2, wherein the remote transmitter is a key fob.

4. The charge cord theft alarm system of claim 1, further comprising an alarm module coupled the alarm interface and configured to sound a horn when the alarm is activated.

5. The charge cord theft alarm system of claim 4, wherein the alarm module is further configured to flash lights when the alarm is activated.

6. The charge cord theft alarm system of claim 4, wherein the alarm module is further configured to notify a user when the alarm is activated.

7. The charge cord theft alarm system of claim 6, further comprising a key fob in wireless communication with the alarm module and configured to notify the user when the alarm is activated.

8. The charge cord theft alarm system of claim 7, wherein the key fob is configured to disarm the alarm module.

9. The charge cord theft alarm system of claim 1, wherein the alarm interface is configured to activate the alarm when the charge cord transitions from the coupled status to the decoupled status when the alarm interface is in the armed state.

10. A method for alerting a user of a theft of a charge cord initially coupled to a charging port on a plug-in vehicle that couples the charge cord to the plug-in vehicle, the method comprising the steps of:
    selectively placing an alarm system on the plug-in vehicle in an armed state or a disarmed state;
    evaluating, in the armed state, a status of the charge cord, wherein the evaluating step includes determining, with a sensor, a status of the charge cord, including a coupled status when the charge cord is coupled to the vehicle and a decoupled status when the charge cord is not coupled to the vehicle, the sensor being arranged proximate to the charging port; and
    alerting the user based on the status of the charge cord by selectively activating the alarm system on the plug-in vehicle,
    wherein the alerting step includes only activating the alarm when an alarm interface coupled to the sensor is in the armed state and the sensor indicates that the charge cord is in the decoupled status.

11. The method of claim 10, wherein the alarming step includes arming the alarm system with a remote.

12. The method of claim 10, wherein the alarming step includes at least one of sounding a horn of the vehicle, flashing a light of the vehicle, or notifying the user via a key fob.

13. The method of claim 10, further comprising disarming the alarm system with a remote.

14. The charge cord theft alarm system of claim 1, wherein the sensor is configured to determine if the charge cord is connected to the charging port of the plug-in vehicle or disconnected from the charging port of the plug-in vehicle.

15. The charge cord theft alarm system of claim 1, wherein the charge cord has a first end configured to be connected to the charging port and a second end configured to be connected to a utility power socket, and wherein the sensor is a proximity sensor configured to detect when the first end of the charge cord is connected to the charging port independent of a status of the second end relative to the utility power socket.

16. The charge cord theft alarm system of claim 1, wherein the sensor is configured to detect removal of the charge cord from the presence of the plug-in vehicle.

17. A plug-in vehicle, comprising:
a battery configured to power the plug-in vehicle;
a charger coupled to the battery and configured to charge the battery;
a charging port coupled to the charger, the charging port being configured to receive a charge cord;
a sensor arranged proximate to the charging port and configured to evaluate a status of the charge cord relative to the charging port, including a connected status when the charge cord is connected to the charging port and a disconnected status when the charge cord is not connected to the charging port; and
an alarm system coupled with an alarm interface to the sensor and configured to selectively operate in an armed state or a disarmed state, wherein
when the alarm interface is in the armed state and the sensor indicates that the charge cord is in the coupled status, the alarm interface is configured to not activate an alarm,
when the alarm interface is in the armed state and the sensor indicates that the charge cord is in the decoupled status, the alarm interface is configured to activate the alarm,
when the alarm interface is in the disarmed state and the sensor indicates that the charge cord is in the coupled status, the alarm interface is configured to not activate the alarm, and
when the alarm interface is in the disarmed state and the sensor indicates that the charge cord is in the decoupled status, the alarm interface is configured to not activate the alarm.

18. The plug-in vehicle of claim 17, wherein the charge cord has a first end configured to be connected to the charging port and a second end configured to be connected to a utility power socket, and wherein the sensor is a proximity sensor configured to detect when the first end of the charge cord is connected to the charging port independent of a status of the second end relative to the utility power socket.

19. The charge cord theft alarm system of claim 17, wherein the alarm interface is configured to not activate the alarm when the alarm interface is in the armed state, the proximity sensor indicates that the charge cord is in the decoupled status, and the proximity sensor indicates that the charge cord is connected to the utility power socket.

* * * * *